United States Patent [19]

Plaessmann et al.

[11] Patent Number: 5,615,043

[45] Date of Patent: Mar. 25, 1997

[54] MULTI-PASS LIGHT AMPLIFIER

[75] Inventors: Henry Plaessmann, Los Gatos; William M. Grossman, Los Altos, both of Calif.

[73] Assignee: Lightwave Electronics Co., Mountain View, Calif.

[21] Appl. No.: 979,576

[22] Filed: May 7, 1993

[51] Int. Cl.$^6$ .......................... H01S 3/081; H01S 3/0933
[52] U.S. Cl. .......................... 359/346; 359/347; 372/95
[58] Field of Search .................................. 359/337, 346, 359/347; 372/72, 95, 108

[56] References Cited

U.S. PATENT DOCUMENTS

| | | | |
|---|---|---|---|
| 3,748,014 | 7/1973 | Belser | 356/112 |
| 4,360,925 | 11/1982 | Brosnar et al. | 372/95 |
| 4,368,986 | 1/1983 | Bennett | 356/445 |
| 4,422,046 | 12/1983 | Munrola et al. | 359/346 |
| 4,785,459 | 11/1988 | Baer | 372/75 |
| 4,894,839 | 1/1990 | Baer | 372/93 |
| 4,908,832 | 3/1990 | Baer | 372/75 |
| 4,951,294 | 8/1990 | Basu et al. | 372/93 |
| 5,103,457 | 4/1992 | Wallace | 372/92 |
| 5,307,358 | 4/1994 | Scheps et al. | 372/108 |

OTHER PUBLICATIONS

Minelly, "Laser–diode–pumped neodymium–doped fiber laser with output power >1W," Paper CWE6, Digest of Technical Papers, Conference on Lasers and Electro–optics, 1992, pp. 246, 247, 249.

Coyle, "Design of a High–Gain Laser Diode–Array Pumped ND:YAG Alternating Precessive Slab Amplifier (APT Amplifier)," *IEEE Journal of Quantum Electronics*, vol. 27, 1991, pp. 2327–2331.

Sandoval, "Angular multiplexing as a technique for short-–pulse amplification in a high–gan xenon amplifier," *Journal of Applied Physics*, vol. 49, 1978, pp. 5745–5749.

Grossman et al., "Axisymmetric Angular Encoder for Laser Fusion," *IEEE Journal of Quantum Electronics*, vol. QE–17, 1981, pp. 1870–1878.

Trutna et al., "Multiple–pass Raman gain *cell*," *Applied Optics*, vol. 19, 1980, pp. 301–312.

Tidwell et al., "Scaling CW Diode–End–Pumped Nd:YAG Lasers to High Average Powers," *IEEE Journal of Quantum Electronics*, vol. 28, 1992, pp. 997–1009.

Baer, "Performance of Diode–Pumped Nd:YAG and Nd:YLF Lasers in a Tightly Folded Resonator Configuration," *IEEE Journal of Quantum Electronics*, vol. 28, 1992, pp. 1131–1138.

(List continued on next page.)

*Primary Examiner*—Nelson Moskowitz
*Attorney, Agent, or Firm*—John F. Schipper; Charles S. Guenzer

[57] ABSTRACT

A multiple-pass laser amplifier that uses optical focusing between subsequent passes through a single gain medium so that a reproducibly stable beam size is achieved within the gain region. A confocal resonator or White Cell resonator is provided, including two or three curvilinearly shaped mirrors facing each other along a resonator axis and an optical gain medium positioned on the resonator axis between the mirrors (confocal resonator) or adjacent to one of the mirrors (White Cell). In a first embodiment, two mirrors, which may include adjacent lenses, are configured so that a light beam passing through the gain medium and incident on the first mirror is reflected by that mirror toward the second mirror in a direction approximately parallel to the resonator axis. A light beam translator, such as an optical flat of transparent material, is positioned to translate this light beam by a controllable amount toward or away from the resonator axis for each pass of the light beam through the translator. The optical gain medium may be solid-state, liquid or gaseous medium and may be pumped longitudinally or transversely. In a second embodiment, first and second mirrors face a third mirror in a White Cell configuration, and the optical gain medium is positioned at or adjacent to one of the mirrors. Defocusing means and optical gain medium cooling means are optionally provided with either embodiment, to controllably defocus the light beam, to cool the optical gain medium and to suppress thermal lensing in the gain medium.

25 Claims, 3 Drawing Sheets

OTHER PUBLICATIONS

Streifer et al., "Phased array diode lasers," *Laser Focus/Electro–Optics*, Jun. 1984, pp. 100–109.

Fan et al., "Diode Laser–Pumped Solid–State Lasers," *IEEE Journal of Quantum Electronics*, vol. 24, 1988, pp. 895–912.

Keyes et al. "Injection luminescent pumping of $CaF_2:U^{3+}$ with GaAs diode laser," *Applied Physics Letters*, vol. 4, 1964, pp. 50–52.

Ross, "YAG Laser Operation by Semiconductor Laser Pumping," *Proceedings of the IEEE*, vol. 56, 1968, pp. 196–197.

Rosenkarntz, "GaAs diode–pumped Nd:YAG laser," *Journal of Applied Physics*, vol. 43, 1972, pp. 4603–4605.

Kubodera et al, "Pure single–mode $LiNdP_4O_{12}$ solid–state laser transmitter for 1.3–μm fiber optic communications," *Applied Optics*. vol. 21, 1982, pp. 3466–3469.

Sipes, "Highly efficient neodymium:yttrium aluminum garnet laser end pumped by a semiconductor laser array," *Applied Physics Letters*, vol. 47, 1985, pp. 74–76.

Fork et al, Opt. Lett., vol. 14, #19, pp. 1068–1070, Oct. 1, 1989; abst only herewith.

Beeker et al, Opt. Lett., vol. 16, #26, pp. 1847–1849, Dec. 1,1991; abst. only herewith.

Plaessmann et al, Opt. Lett., vol. 18, #17, pp. 1420–1422, Sep. 1,1993; abst only herewith.

Olson et al, IEEE Photonics Technol. Lett., vol. 6, #5, pp. 605–608, May 1994: abst only herewith.

Fork et al., Rev. Phys. Appl. (France), vol. 22, #12, pp. 1665–1671, Dec. 1987; abst. only supplied herewith.

Plaessmann et al, IEEE Photonics Technol. Lett., vol. 3, #10, pp. 885–887, Oct. 1991, abst. only herewith.

Gerstenberger et al, CLRO–88, vol. 7, Apr. 29, 1988, pp. 296, 298; abst. only herewith.

Grossman et al, IEEE J. Quant. Elec., vol. QE–17, #9, pp. 1870–1878, Sep. 1981; abst. only herewith.

Khoroshilov et al., "10kHz–Rate Amplification of 40–fs Optical Pulses at Low Pumping Energy," *Ultrafast Phenomena VI* (Springer Verlag, Berlin, 1988), pp. 22–23.

Georges et al., "High–efficiency multipass Ti:sapphire amplifiers for a continuous–wave single–mode laser," *Optics Letters*. vol. 16, 1991, pp. 144–146.

White, "Long Optical Paths of Large Aperture," *Journal of the Optical Society of America*, vol. 32, 1942, 285–288.

Kogelnik et al., "Laser Beams and Resonators," *Proceedings of the IEEE*, vol. 54, 1966, pp. 1312–1329.

Fork et al., "Multipass optical amplifier using a double confocal resonator geometry," *Revue Physique Applique*, vol. 22, 1987, pp. 1665–1771.

Plaessman et al., "Reducing Puilse Durations in Diode Pumped Qswitched Solid–State Lasers," *IEEE Photonics Technology Letters*, vol. 3, 1991, pp. 885–887.

MULTI-PASS LIGHT AMPLIFIER

FIELD OF THE INVENTION

The invention relates generally to lasers and more particularly to amplification of optical power by laser gain media. This work was performed under NASA Contract No. NAS 7-1145. The U.S. Government has certain rights in this invention.

BACKGROUND OF THE INVENTION

Lasers and laser amplifiers can be energized by many different means and may use many different laser media. Of special interest here are laser amplifiers energized or "pumped" by laser diodes. For a review of laser diode pumped solid-state lasers see T. Y. Fan and R. L. Byer, "Diode laser-pumped solid-state lasers", I.E.E.E. Jour. of Quant. Elec., vol. 24 (1988) pp. 895–912. Here the term "solid-state lasers" includes all lasers, except semiconductor laser diodes (referred to as "laser diodes"), in which the laser gain medium is a solid-state material. Original work in laser diodes, and a laser diode's applicability to pumping of solid-state lasers, is discussed by W. Streifer et al, "Phased array diode lasers", Laser Focus/Electro-optics, Jun. 1984, pp. 100–109, by R. J. Keys and T. M. Quist, "Injection luminescent pumping of $CaF_2:U^{3+}$ with GaAs diode lasers", Appl. Phys. Lett., vol. 4 (1963) pp. 50–52, and by M. Ross, "YAG laser operation by semiconductor laser pumping", Proc. I.E.E.E., vol. 56 (1968) pp. 196–197. New high power laser diodes can be used for laser diode pumping. However, the pump light must overlap the mode of the solid-state laser to obtain efficient laser operation, and a good geometry for doing this is end-pumping. These are discussed by L. J. Rosencrantz, "GaAs diode-pumped Nd:YAG laser", Jour. Appl. Phys., vol. 43 (1973) pp. 4603–4605, by K. Kubodera and J. Noda, "Pure single mode $LiNdP_4O_{12}$ solid-state laser transmitter for 1.3 μm fiber-optic communications", Appl. Optics, vol. 21 (1982) pp. 3466–3469, and by D. L. Sipes, "Highly efficient neodymium: yttrium aluminum garnet laser end pumped by a semiconductor laser array", Appl. Phys. Lett., vol. 47 (1985) pp. 74–76.

Thermal lensing in the laser gain media can perturb the laser or amplifier optics and degrade the mode overlap in the media. In addition, light from higher power laser diodes is often far from diffraction limited; such light does not appear in a single transverse spatial mode. Work has been applied toward designing solid-state laser cavities and optics that transfer diode light so that the pump light and the solid-state laser mode efficiently overlap in the laser gain medium.

For many applications increased laser power is useful. One way to increase power is to make a more powerful laser oscillator. But, as with electronic oscillators, it is often easier to obtain desired characteristics from a small, well-controlled laser oscillator, and then amplify the oscillator's output to obtain higher powers. Amplifiers potentially can scale short-pulse or frequency-stable laser oscillators to high power.

Laser amplifiers can increase optical power and are as old as lasers themselves. Linear amplifiers, fiber amplifiers, and multi-pass amplifiers have been built, and are discussed in the references cited below. However, much of the work on amplifiers using diode-pump sources has been on two categories of amplifiers. The first is diode-pumped fiber amplifiers for communications applications. Fiber amplifiers have tremendous utility as low-noise high-gain amplifiers, but they are not ideally suited for use in high peak or average power applications because the fiber may damage, and it is difficult to pump single-transverse-mode fiber with high power diodes that are not themselves single transverse mode. See J. D. Minelly et al, "Laser diode-pumped neodymium-doped fiber laser with output power >1 W", paper CWE6, Conference on Lasers and Electro-optics, 1992, Digest of Technical Papers, Opt. Soc of America, Washington, D.C., for a particular approach to this problem. The second category of amplifier is single- or double-pass amplifiers where for efficiency the input must be energetic enough to saturate the amplifier. These amplifiers in the master oscillator/power amplifier configuration are technologically very important. However, these lasers are not generally optimized for large gain, but rather for high power, high energy, and high extraction efficiency. One example of an amplifier that does not fall directly into the two broad categories above is the tightly folded amplifier or resonator disclosed by T. M. Baer in U.S. Pat. Nos. 4,785,459, 4,894,839 and 4,908,832. Another example is a precessing slab amplifier discussed by D. B. Coyle, "Design of a high gain laser diode array-pumped Nd:YAG alternating precessive slab amplifier", I.E.E.E. Jour. Quant Elec., vol. 27 (1991) pp. 2327–2331.

R. P. Sandoval, in "Angular multiplexing as a technique for short-pulse amplification in a high gain xenon amplifier", Jour. Appl. Phys., vol. 49 (1978) pp. 5745–5749, notes that passing a sequence of light beams through the same volume of an amplifier but at different angles will amplify short pulses, if a significant fraction of the available energy is extracted with each pass and if amplified spontaneous emission is suppressed. W. M. Grossman et al, in "Axisymmetric angular encoder for laser fusion", I.E.E.E. Jour. Quant. Elec., vol. QE-17 (1981) pp. 1870–1878, disclose use of a multi-pass refocusing ring laser amplifier, which is only marginally stable when operating as an oscillator, using angle mutiplexing; the optical ring is purposely misaligned relative to the injected beam. W. R. Trutna and R. L. Byer, in "Multiple-pass Raman gain cell", Appl. Optics, vol. 19 (1980) pp. 301–312, describe use of a stable resonator for multi-pass amplification of Raman radiation, using angle multiplexing; the successive light beams do not pass through a single point in the gain medium.

Even with higher power laser diode sources, the efficient end-pumped configuration is commonly believed to limit the amount of energy that can be used (as stated by Baer, Welford et al, and Tidwell et al; see the citations in this patent), thereby limiting the power of the laser, since the power densities in the pump region of the gain medium become too high and the heat produced cannot be removed. One difficulty encountered with large heat deposition in oscillators is that heat flow results in thermal lensing and aberrations in the laser gain medium and can also lead to thermal birefringence and thermal fracture and loss of efficiency. Thermal lensing is inherent in high power side-pumped or end-pumped lasers. One technique to reduce thermal aberrations in resonators is to apply compensating optics as suggested by S. C. Tidwell et al, "Scaling CW diode end-pumped Nd:YAG lasers to high average powers", I.E.E.E. Jour. Quant Elec., vol. 28 (1992) pp. 997–1009.

Another approach is to design a laser cavity with an elliptical optical mode shape as suggested by R. W. Wallace et al, "Elliptical Mode Cavities for Solid-state Lasers Pumped by Laser Diodes", U.S. Pat. No. 5,103,457. Use of an elliptical mode, rather than a circular mode, aids in heat transfer and helps match the cavity mode to the shape of the pumped volume provided by some higher power laser diode sources. However, in diode-pumped amplifiers to date, avoiding the effects of thermal focusing and thermal aberrations has not been adequately addressed. The subject invention discloses a technique for efficient laser amplification that can give high gain and high efficiency with reduced sensitivity to thermal lensing in the laser amplifier media. This technique can accept end-pumped or side-pumped geometries and is not restricted to use of laser diode pumps for laser gain medium pumping.

Some side-pumped diode-pumped amplifiers and variations on end-pumped diode-pumped amplifiers have been built. In these amplifiers the ability to produce high gain is still impaired by thermal lensing. In T. M. Baer et al, "Performance of diode pumped Nd:YAG and Nd:YLF lasers in a tightly folded resonator configuration", I.E.E.E. Jour. Quant Elec., vol. 28 (1992) pp. 1131–1138, the authors state that the tightly folded design is difficult to use due to thermal lensing, when using the important laser medium, Nd:YAG. The subject invention produces greater gain with less pump power.

The geometry of the subject invention bears some resemblance to the earlier work of E. V. Khoroshilov et al, "10 kHz-Rate Amplification of 40-fs Optical Pulses at Low Pumping Energy", Springer Series in Chemical Physics, vol. 48, *Ultrafast Phenomena VI*, Springer Verlag, Berlin/Heidelberg, 1988, pp. 22–23 and the work of P. Georges et al, "High efficiency multi-pass Ti:sapphire amplifiers for a continuous-wave single-mode laser", Optics Lett., vol. 16 (1991) pp. 144–146. However, the designs of these workers are fundamentally different in both implementation and effect from those of the subject invention. Khoroshilov et. al. and Georges et al use amplifier cells where a laser beam is multiply passed through a gain medium, and the beam is refocused between passes of the amplifier, as shown in FIG. 1. This geometry employs two mirrors that are ideally parabolic and of differing focal lengths deployed around the gain medium, with the mirrors positioned to have common foci and the gain medium being located at the common foci of the mirrors.

FIG. 1 illustrates a design disclosed by Georges et at, ibid. An optical amplifier cell 130 shown in FIG. 1 has a laser gain medium 101 of Ti:sapphire and has a central or resonator axis 104. A frequency doubled Nd:YAG laser beam 102 pumps the gain medium 101. The central axis 104 of the cell 130 passes through the gain medium 101. The path of a light beam passes through the gain medium 101 and is translated downward as a result of passing through two Brewster angle faces of the gain medium. A light beam 112 is introduced into the cell 130 parallel to, but offset by a distance d from, the central axis 104 of the cell, which axis is also the central axis of the pump beam 102. The input or probe beam 112 to be amplified passes through an aperture or hole in an inwardly facing parabolic or spherical mirror 105 of focal length $F_1$. The beam 112 then passes outside the gain medium 101 where the beam is amplified and develops a beam waist in a transverse plane 107 that contains the mirror loci. This beam waist occurs because of beam tailoring optics external to the amplifier that are supplied by the user, a standard design problem for those skilled in optics.

The light beam 112 is incident on a parabolic or spherical mirror 106 of focal length $F_2$, where $F_2 < F_1$ so that the mirrors have unequal focal lengths. The beam 112 is reflected from the mirror 106 as a light beam 113 through the gain medium 101 to form another beam waist in the gain medium. An amplified light beam 114 passes out of the gain medium 101 and is incident upon and reflects from the mirror 105. The resulting reflected beam 115 propagates parallel to the central axis 104 of the cell, but offset from this axis by a distance of $d(F_1/F_2)$, which is greater than d. The beam 115 passes outside the gain 101 and develops a beam waist in the plane 107 of the beam foci. The beam 115 is then incident upon the mirror 106. The light beam 115 is reflected as a light beam 116 and proceeds toward the gain medium 101, where this beam is amplified as a light beam 117, and continues toward the mirror 105. A light beam 118 approaches and is reflected from the mirror 106 as a reflected light beam 119. The reflected beam 119 passes to another waist in the gain medium 101, where the beam is further amplified as a light beam 120. The beam 120 propagates parallel to the central axis 104 of the cell, but offset from it by a distance $d_{offset}$ of:

$$d_{offset} = d(F_1/F_2)^2. \tag{1}$$

The beam is sequentially amplified and displaced from the central axis 104 in a geometric progression of displacements. After sufficient amplification the beam is extracted from the amplifier cell 130 by a mirror 108 tot produce a light beam output 109. If the mirror 108 is moved away from the central axis 104, the number of passes the beam makes within the amplifier cell is increased, if the mirrors 105 and 106 have sufficiently large diameters. The difference $\Delta_n$ in the offset distance between adjacent beams on the same side of the central axis 104, separated by two consecutive beam passes through the gain medium 101, is $$\Delta_n = d((F_1/F_2)^{n+2} - (f_1/F_2)^n), \tag{2}$$

where n is the number of passes of the light beam through the gain medium 101 for the earlier beam. Each time a light beam is displaced to a leg further removed from the central axis 103, the beam diameter at the waist in the collimated leg is also magnified by the ratio $F_1/F_2$, and in the next pass of the beam through the gain medium the beam waist is demagnified by the inverse ratio: $F_2/F_1$. In many situations this apparatus would produce superior results, if the beam diameter did not geometrically vary in this way, but rather was fixed at approximately the diameter of the pumped region of the gain medium 101. Mismatching the diameters of the light beam and the pumped region of the gain medium results in inefficient energy extraction and/or reduction of gain.

Optimally, the ratio $F_1 F_2$ and the input beam waist radius are chosen so that the beam waists in the gain medium 101 on the later passes of the cell fill the pumped region of the cell in order to get useful energy extraction. Also the ratio $F_1 F_2$ and the input beam waist radius need to be chosen so that the difference in the offset between adjacent beams on the same side of the central axis, given by Equation (2), is greater than about 2.5 beam diameters, to avoid clipping the beam and producing diffractive losses when the beam passes a sharp edge. In the geometry of FIG. 1, an optional mirror 110 and lens 111 are positioned to reflect unabsorbed pump light back through the gain medium 101, to maximize the absorption of the pump light. The fact that the light beam diameter increases geometrically after each pass through the amplifier cell 130 in the design of Georges et al shown in FIG. 1 makes it harder to achieve a large number of passes through the gain medium 10 1, because the beam radius rapidly becomes too large for the radii of the mirrors 105 and 106. The progression of beam diameters and locations, 121, 122, 123, 124 (not drawn to scale in FIG. 1) indicates how the beam diameters grow as the beam is translated outward from the central axis 104 of the amplifier cell 130.

Many techniques are available to amplify light, but such techniques are often restricted in their uses and cannot be used for several formats such as cw, Q-switched pulses, or mode-locked pulses. What is needed is a laser amplifier that is efficient and cost-effective and offers high gain. Preferably, the apparatus should be able to amplify a beam with a Gaussian or near-Gaussian profile without profile degradation. Preferably, the amplifier geometry should have reduced sensitivity to thermal lensing and should accept a wide range of pumping mechanisms, including laser diode pumping.

SUMMARY OF THE INVENTION

These needs are met by the invention, which provides light amplifier apparatus using an optical resonator including two or three mirrors facing each other on opposite sides of a common focal plane. In a first embodiment, two mirrors are arranged so that a light beam that passes through a common focal point is subsequently received by one of the mirrors and reflected toward the other mirror so that the reflected light beam moves approximately parallel to an axis of the resonator. The apparatus includes an optical gain medium positioned at the common focal point and provides a light beam translator of optically transparent material. The translator receives and passes a light beam travelling approximately parallel to the resonator axis. The light beam that issues from the translator is again approximately parallel to the resonator axis but is translated a small, controllable amount toward or away from the resonator axis. The resonator can be a confocal resonator or can be a White Cell, discussed below.

The invention places a laser gain medium within a multi-pass cell to form a multi-pass amplifier that has high efficiency and high small-signal gain. The cell is a confocal, optically stable resonator for internal refocusing but is configured in a multiple-pass geometry. Inclusion of a light beam translator in the apparatus allows use of non-overlapping beam paths, with the exception of a region surrounding the laser gain medium. The apparatus also includes means to introduce a light beam into, or remove a light beam from, the amplifier cell.

DESCRIPTION OF PREFERRED EMBODIMENTS OF THE INVENTION

The invention in the preferred embodiment is a multi-pass laser amplifier cell that has optical focusing and beam apodizing properties for the beam under amplification similar to, but distinct from, a "stable resonator", in the terminology of A. E. Siegman, *Lasers*. University Science Books, Mill Valley, Calif., 1986, pp. 744–756. The beam profile varies little in successive passes through the amplifier, given the proper input profile. However, the beam differs from a stable oscillator beam in that this beam follows a non-reproducing path that is ultimately steered out of the cell after amplification. "Confocal" means the amplifier is configured with mirrors, or equivalent optics, where the foci of all these opposing focusing mirrors lie in a midplane between these mirrors, and the mirrors do not necessarily have equal focal lengths. Mirrors of this sort can be replaced by lens-mirror combinations with equivalent powers without changing the design concept, and the design may also be folded by use of reflective flat mirrors. In a preferred embodiment the amplifier gain medium is diode end-pumped. However, the basic amplifier concept is neither restricted to diode pumping nor to solid-state gain medium, and the amplifier may be end-pumped or side-pumped. End pumping typically produces higher efficiency. Side pumping affords the possibility of spreading greater pump power over a longer gain material, which can help reduce the threat of thermal fracture.

Figure 2:
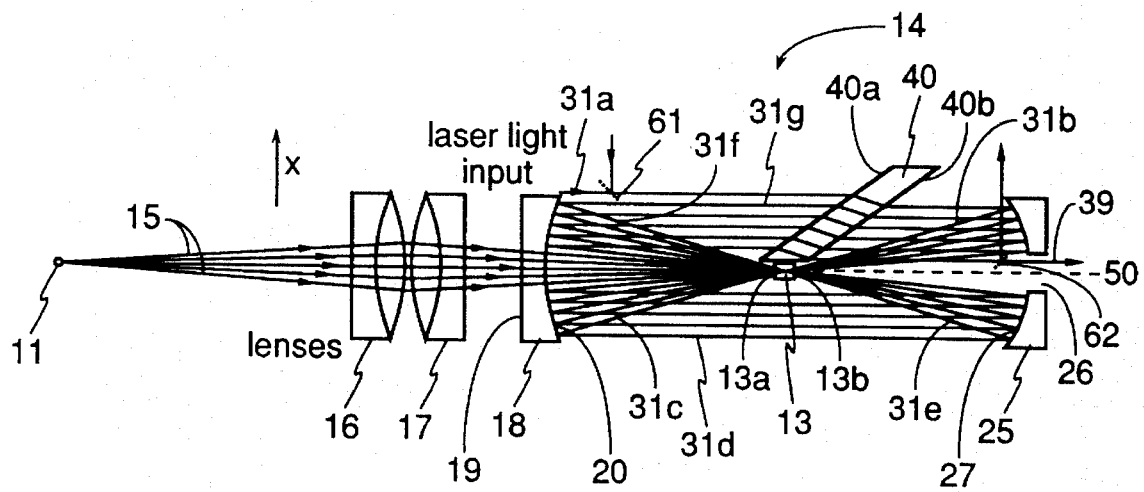
FIG. 2 illustrates an embodiment of this invention, including a laser diode end-pumped solid-state gain medium within a multi-pass cell. A Brewster angle glass plate causes the beam to take a different path on each pass of the gain medium.
Figure 3:
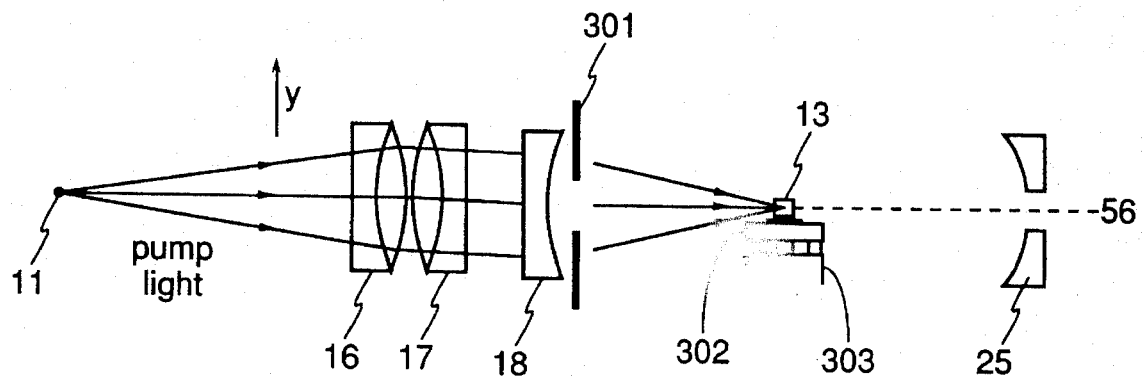
FIG. 3 is a side view of the amplifier design shown in FIG. 2, with a light beam aperture included.

The amplifier apparatus of our invention, shown in FIGS. 2 and 3 in one embodiment, maintains a near-constant spot size over many passes in the amplifier gain medium, which is important in allowing an arbitrarily large number of passes through the gain medium. This also allows the beam to fill the gain region fully and the gain profile effectively filters the beam after each pass making the amplifier less sensitive to alignment and producing good transverse profile output.

In the preferred embodiment shown in FIGS. 2 and 3, a light source 11 pumps a gain medium 13 positioned inside an optical resonator that is part of an amplifier cell 14. The source 11 may be any optical pump. A preferred pump is one or more laser diodes, or the tailored beam from one or more laser diodes sent using lenses, mirrors, prisms, fibers or other standard optical components to the light source 11. In one of our particular tests we use a laser diode with an 1 by 200 μm light-emitting region. A 200 μm diameter cylindrical lens collimates the diode light in the widely diverging dimension which is perpendicular to the plane of the diode junction and perpendicular to the long dimension of the light source. A light beam 15 from the source 11 is imaged by a pair of achromatic lenses, 16 and 17 to focus in the laser gain medium 13 which may be a solid-state material, such as Nd:YLF, but need not be crystalline. Similarly, many diode pump light imaging systems may be used and the amplifier concepts are not restricted to one-to-one imaging or to use of achromatic lenses. The pump light first passes through a first mirror 18, with light-receiving surfaces 19 and 20 that have high transmission coatings at the laser diode or pump wavelength (for example, $\lambda_P$=798 nm), and the coating on surface 20 is highly reflecting at the wavelength $\lambda_L$ of the laser light being amplified (the "laser" wavelength). A first surface 13a of the laser gain medium 13 is highly transmissive for both the laser and the diode wavelengths, and the surface 13a of the gain medium is highly transmissive for incident light at the laser wavelength $\lambda_L$. A second gain medium surface 13b might be chosen to be reflective for the diode wavelength $\lambda_P$ to recapture some of the diode light not absorbed in passing through the laser gain medium 13. However, the second surface 13b preferably has an antireflection coating for incident light at both the dime and laser wavelengths. This choice of antireflection coating also allows the laser medium to be optionally pumped from both sides.

The laser gain medium 13 is held in a thermally conductive housing, shown in FIG. 3 with heat spreader 302 attached to cooler 303, that allows heat to flow from the laser gain medium when the medium is absorbing waste heat generated during pumping. A plate 40, appearing in FIG. 2 and discussed below, is not shown in FIG. 3, for purposes of clarity.

A second mirror 25 in FIG. 2 faces the first mirror 18 and has a coated surface 27 that is highly reflective to the laser light. An aperture 26 is placed in the second mirror 25 to allow the input light beam 39 after amplification to subsequently pass out of the amplifier cell 14 after N cycles through the cell (N=1, 2, . . . ). Alternatively, the light beam path through this multi-pass cell is reversible: the beam can enter instead of exit at the aperture 26 in the second mirror 25, and it is sometimes slightly easier to align the light beam to enter the optical resonator 14 through the aperture.

An input light beam 31a enters the amplifier cell or resonator 14 by passing, or passing through an aperture in, the first mirror 18 parallel to the central or resonator axis 50 of the amplifier cell and the pump optics. The input beam 31a passes through a glass plate or similar transparent medium 40 having two substantially parallel, planar, light-receiving surfaces 40a and 40b. The surfaces 40a and 40b of the plate 40 are polished and are oriented at the Brewster angle for the plate material relative to the propagation direction of the beam 31a. Thus, when the input light beam 31a is properly polarized in the plane of FIG. 2, there is practically no energy loss at either surface 40a or 40b of the plate 40. As a result of passing through the plate 40, the input beam 31a is laterally displaced toward (or away from) the laser gain medium 13 and the central axis 50 by a transverse displacement distance $\Delta s$ given by $$\Delta s = t(n_2/n_1 - n_1/n_2)n_1/(n_1^2 + n_2^2)^{1/2}, \quad (3)$$

where t is the plate thickness and $n_1$ and $n_2$ are the refractive indices of the ambient medium within the cell and of the plate material, respectively.

The thickness t of the plate 40 is chosen so that the transverse displacement distance $\Delta s$ of the light beam is typically 2.5 beam diameters so that the beams do not overlap upon consecutive passes through the cell. The beam 31a is reflected as a beam 31b from the second mirror 25, and the beam 31b is directed along a path that passes through the laser gain medium 13, with a beam waist diameter at the gain medium chosen to approximately equal the diameter of the pumped volume in the gain medium. The beam 31b passes through the laser gain medium 13 and emerges as an amplified beam 31c, and this light beam approaches and is reflected from the first mirror surface 18. A reflected and redirected beam 31d then propagates parallel to the central axis 50 until this beam is reflected from the second mirror 25 as a light beam 31e. The reflected and redirected beam 31e is focused and passes through the laser gain medium 13, with a beam waist diameter that is nearly equal to its diameter the last time the beam passed through the gain medium. An amplified light beam 31f emerges from the laser gain medium 13.

After this second amplification, the resulting beam 31f passes from the laser gain medium 13 to the first mirror 18, where the beam is reflected and becomes a light beam 31g. The reflected and redirected beam 31g then propagates parallel to the central axis 50 and is again transversely displaced by passage through the plate 40. The light beam 31g and its successors continue to pass through the cell, being displaced inward (or outward) with each pass through the plate 40. When a light beam traveling the indicated path within the resonator has been displaced transversely inward (or outward) a sufficient distance, the light beam exits the from amplifier cell 14 through an aperture 26 in (or past the edge of) the second mirror 25.

Pump power dissipated at the laser gain medium 13 generally creates a thermal lens through heating of the medium. The pair of mirrors 18 and 25 (preferably of parabolic shapes) reimage a light beam passing through the gain medium 13 back through the gain medium with approximately unity magnification. In the presence of a thermal lens within the gain medium 13, this beam reimaging still occurs, and the beam radius does not change in the laser gain medium from one pass to the next pass. This de-emphasizes the sensitivity of beam extraction efficiency to thermal lensing, one of the objectives of the invention. However, with thermal lensing present, the beam waist location and waist diameter do change. This change can cause the beam diameter to become too large in some places, resulting in unwanted beam aperturing and losses.

Development of a thermal lens can be compensated for, and these losses can be minimized or avoided. One means to achieve this is to provide curvature on the surfaces 13a and/or 13b of the laser gain medium 13. For example, use of surfaces 13a and/or 13b with concave curvature compensates for positive thermal lensing, and use of surfaces 13a and/or 13b with convex curvature compensates for negative thermal lensing. The choice of curvature is based on the particular laser gain material used and thermal load within the gain material. Preferably, a light beam passing through the curved surfaces 13a and 13b and through the thermal lens region of the gain medium 13 should have substantially reduced net optical focusing power, or no net optical focusing power. It is optimal, but not essential, to position two corrective surfaces 13a and 13b approximately symmetrically about the thermal lens or gain medium 13, to avoid altering the beam path through the gain medium. This is a design problem that depends upon the laser medium, pump power, and pump focusing chosen.

Figure 2A:
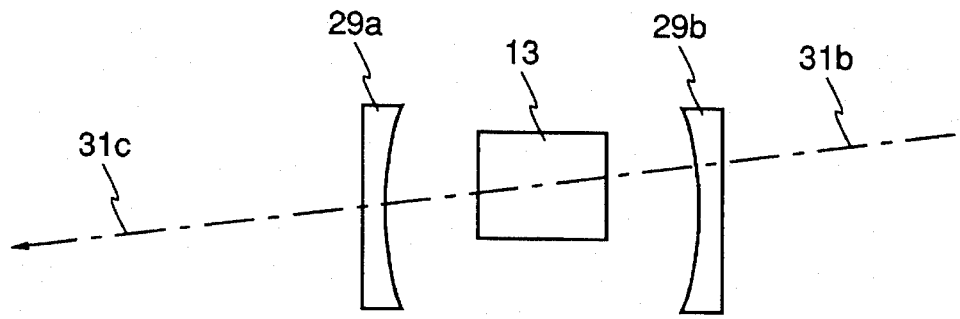
FIG. 2A is expanded view of a portion of FIG. 2.

Another method of compensating for thermal lensing is to place a selected lens 29a shown in FIG. 2A, between the gain medium 13 and either the first mirror 18 or the second mirror 25 or both, to slightly defocus the light beam. It is optimal, but not essential, to position two corrective lenses 29a and 29b approximately symmetrically about the thermal lens or gain medium 13, to avoid altering the beam path through the gain medium.

In one particular embodiment tested in our laboratory, the laser gain medium 13 is a 3 mm by 3 by 3.5 mm (length) body of 1.45 percent doped Nd:YLF with anti-reflection coatings on the flat polished 3 mm by 3 mm faces. The pump light enters through one 3 mm by 3 mm face, and the beam being amplified enters and exits through the pair of opposing 3 mm by 3 mm faces. One 3 mm by 3.5 mm face of the gain medium 13 is glued to a thermoelectric cooler, and the crystalline c-axis of the laser gain material lies in the plane of FIG. 2. The pump diode is a 2 Watt, 200 µm laser diode (Spectra Diode Labs model 2370C), and 1.6 Watts of pump light is collected and incident on the Nd:YLF gain medium 13. The diode light is collimated by a 200 µm diameter fused silica rod lens before reimaging by lenses 16 and 17, each with diameter and focal length about 50 mm and 120 mm, respectively. The mirrors 18 and 25 are parabolic, have diameter and focal length of about 50 mm and 100 mm, respectively, and are spaced apart along the resonator axis 50 by twice a mirror's focal length, or approximately 200 mm. The pump diode light and the laser light are also polarized in the plane of FIG. 2. The thickness of the Brewster angle plate 40 is about 5 min. The light beam diameter in the collimated region is about 1 mm, and the beam diameter at the Nd:YLF gain medium 13 is about 0.2 mm. The laser diode is focused to a 0.2 mm diameter spot.

Figure 1:
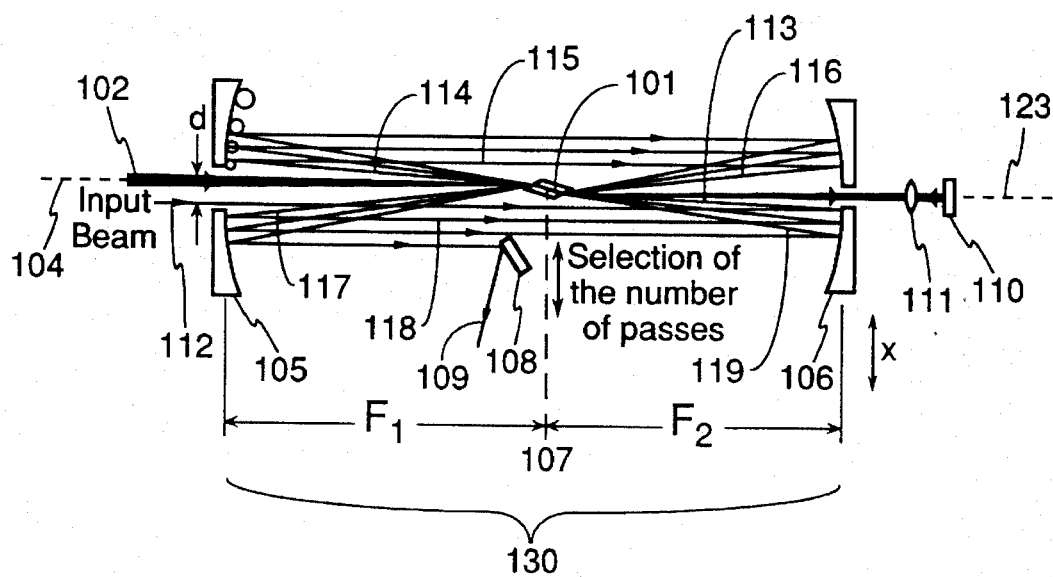
FIG. 1 is a diagram of an amplifier in the prior art by Georges et al, including a frequency doubled Nd:YAG laser end-pumped Ti:sapphire gain medium within a multi-pass cell. The opposing mirrors forming the multi-pass cell are of differing focal lengths, causing the beam to take a different path on each pass of the gain medium.

The embodiment illustrated in FIGS. 2 and 3 differs from the design of Georges et al shown in FIG. 1: Our invention provides a beam waist size that is approximately constant for all passes of the light beam through the gain medium 13. This is also true for a second embodiment, illustrated in FIG. 6 and discussed below. The progression of beam transverse displacement inward or outward from the central or resonator axis 50 in FIG. 2 is linear, not geometric as in the Georges et al design shown in FIG. 1.

In the geometries of Khoroshilov et al and of Georges et al discussed above: (1) the amplified beam path is translated geometrically through the multi-pass cell by making the parabolas of different focal lengths (not "symmetric confocal") so that the beam waist increases (or decreases) geometrically on each pass, which can be undesirable; (2) the Georges et al and Khoroshilov et al pumps are near diffraction limited; and (3) the Georges et al apparatus pumps through a small hole in one of the parabolic mirrors in the amplifier so that the pump light beam must be able to fit through the mirror's aperture. In the geometry of the subject invention, (1) the amplified beam path is translated linearly, with the beam diameter being approximately constant throughout amplification, (2) laser diode pumping is employed, and (3) the pump beam uses a larger numerical aperture than the hole in the Georges design and thus can accept inferior and less diffraction-limited pump beams.

After 12 passes of a light beam through the Nd:YLF gain medium, 13 we measure 38 dB of small signal gain of the light beam, comparing amplified power out to unamplified power output from the cell. Typical laser amplifier results from this configuration are shown in Table 1. Those data were taken with 12 passes of the amplifier, with a temperature controlled Nd:YLF gain medium, and with 1.6 Watts of pump energy focused on the amplifier medium. The time durations $\Delta t$ are input pulse widths, full width at half-maximum intensity.

TABLE 1

Typical amplifier results with continuous (cw) or pulsed input

|  | Unamplified output | Amplified output |
| --- | --- | --- |
| cw input (small signal) | 5 µwatts | 30 mwatts |
| cw input | 1 mwatt | 240 mwatts |
| cw input (near saturation) | 35 mwatts | 620 mwatts |
| 1 kHz pulsed input, $\Delta t$ | 6 µjoule, 1.0 nsec | 125 µjoule, 1.0 nsec |
| 10 kHz pulsed input, $\Delta t$ | 2.5 µjoule, 2.1 nsec | 45 µjoule, 2.1 nsec |

Variations on the embodiment shown in FIGS. 2 and 3 may be helpful in particular situations. In other tests we have used 2 to 16 passes of the gain medium 13, and the concept shown here is obviously extendible to fewer or greater numbers of passes. With appropriate optics chosen, either odd or even numbers of light beam passes through the amplifier cell 14 are possible. Once the light beam efficiently extracts the energy or power available from the gain medium 13, additional passes merely present a loss due to addition of surfaces and added alignment complexity. In another variation on the embodiment shown in FIGS. 2 and 3, the path of the beam through the amplifier could be reversed, with the input and output interchanged. In this reversed embodiment, the input light beam enters the amplifier cell 14 through the hole or aperture 26 positioned adjacent to or on the resonator axis 50 and passes out of the cell at the edge of one of the mirrors 18 or 25.

Figure 4:
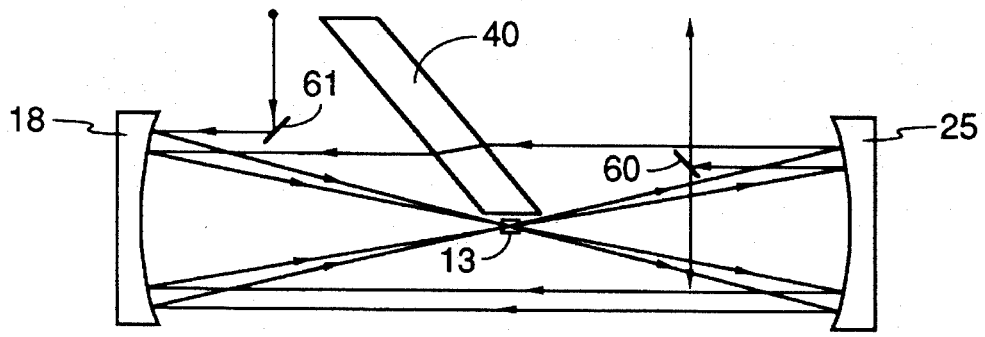
FIG. 4 illustrates an embodiment, analogous to that of FIG. 2, in which a light beam is inserted into, or removed from, an amplifier cell using a small mirror.

In an alternative embodiment, shown in FIG. 4, the beams can be coupled into and/or out of the amplifier cell 14 by small mirrors 61 and/or 62 positioned to receive a light beam and reflect this beam into the cell (mirror 61) or out of the cell (mirror 62). This embodiment does not require provision of a hole or aperture in either of the end mirrors 18 or 25.

The laser gain medium 13 can optionally be side-pumped from one or both sides of the cell. The gain medium 13 can also be longitudinally pumped, through the first mirror 18 or through the aperture 26 in the second mirror 25.

The input light beam can be tailored using a variety of optical means (lenses and/or mirrors) to position a beam waist within the gain medium 13 with the desired waist radius. The optical paths shown in FIG. 2 can be folded using mirrors to make the amplifier or the pump beam optics fit into desired arrangements. The laser gain medium 13 can be attached to a heat spreader 302, as shown in FIG. 3, at one or more surfaces of the gain medium, to draw off accumulated thermal energy from the gain medium.

The plate 40 can be oriented at an angle different from the Brewster angle, to provide fine adjustments for the transverse displacement of the light beam. For a large deviation from the Brewster angle, antireflection coatings can be applied to light-receiving surfaces 40a and 40b of the plate 40 to reduce surface losses.

The light beam path shown in FIGS. 2, 3 and 4 is displaced or translated in one spatial direction (x in FIG. 2) away from (or toward) the central axis 50 on progressive cycles through the amplifier cell, as shown explicitly in FIG. 2. In another spatial direction (y in FIG. 3), which is independent of but need not be orthogonal to the x-direction in FIG. 2, a beam aperture 301, shown in FIG. 3, is inserted to suppress parasitic oscillations in the light beam. If the gain of the amplifier is not great enough, the light beam leaving the cell 14 can be reimaged back into the cell in the y-direction shown in FIG. 3, and a second Brewster angle plate (not shown) can be added so that the re-introduced light beam is transversely displaced within the cell in both the x- and y-directions. This second plate (optional) would suppress parasitic oscillations, and the aperture 301 introduced above for this purpose would not be needed.

However, with too much gain present, amplified spontaneous emission (ASE) begins to waste power. With 38 dB of small signal gain present, ASE consumes 5 to 10 milliwatts of the unsaturated output, but far less of the saturated output. This 5 to 10 mwatts is about 1 percent of the power available to the amplified beam. With substantially larger small-signal gain, the ASE would absorb more power from the amplifier and would contribute to a large optical noise background from the amplifier. The second optional plate would be suitable only if the single pass gain of the light beam is lowered by use of a larger beam or of a lower gain laser medium. The ASE itself may be useful for some applications as a spatially near diffraction-limited source of broad-band light. The ASE can be intentionally increased greatly by placing a mirror on one end of the amplifier, if the object is to produce an output light beam consisting of ASE light.

The embodiments shown in FIGS. 2, 3 and 4 are suitable for (longitudinal) end-pumping of the gain medium by a variety of pumping sources and optics. Optionally, the gain medium could also be side-pumped, with some loss in efficiency. If more gain is desired, the light beam that emerges from the amplifier cell 14 can be retro-reflected and passed through the cell along the same path but in the reverse direction. A Faraday rotation isolator or other suitable light beam separator can be positioned at the light beam input end to separate the input light beam from the retroreflected output light beam. Use of a retroreflected light beam that propagates in the reverse direction is preferable to cycling of the light beam through the cell 2N times rather than N times. The area of the optically finished mirrors 18 and 25 in FIG. 1 need not be increased to allow for additional transverse light beam displacement that accompanies the extra cycles for a retro-propagated light beam.

As an alternative approach, two or more amplifier cells could be placed in series to obtain increased amplification, if more gain or power is desired. The amplifier cells can be progressively larger in power and in physical size. If the amplifiers are not saturated and are storing energy, as they might do awaiting input from an infrequently pulsed oscillator, ASE or parasitic oscillations may be a problem with the greater gain of a series of amplifier cells. A series of amplifiers operating in saturation can be used with cw pump energy input.

The amplifier cell 14 shown in FIGS. 2, 3 and 4 can be pumped with higher power diodes. We have pumped Nd:YAG, and Nd:YVO$_4$ with up to 12 Watts of pump power, although this is not a limit to the possible pump power. Many other laser materials may be used including solids such as, but not limited to: Nd:YLF, Nd:YAG, Nd:YVO$_4$, Nd:YOS, Cr:LiSAF, Cr:LiCAF, Er:glass, Tm:YLF, Tm:YAG, Tm:YVO$_4$, Ho:Tm:YLF, Ho:Tm:YAG, Ho:Tm:YVO$_4$, Yb:YLF, Yb:YAG, Yb:YVO$_4$, Nd:glass, Ti:sapphire, ruby, alexandrite, other Nd doped materials or materials in YAG, YLF, YOS, or YVO$_4$ hosts. Liquid and gaseous laser media may also be used as the gain medium 13. Each of these materials can support light beam amplification for one or more wavelengths of light.

Diode pump sources emit from apertures of different sizes. Using larger (or smaller) area sources, the pumped volume in the laser gain material of the amplifier cell can increase (or decrease), and for optimal amplifier output power the diameter of the beam being amplified in the laser material is also optimally increased (or decreased). This is done by focusing the input beam more (or less) tightly at the midplane of the amplifier so that the first reflection from the parabolic mirror makes the beam focus less (or more) tightly in the laser material. Scaling the whole system in size is more complex and affects the cost, the pumping method, the laser gain medium size and mounting, and the number of passes the beam can make in the amplifier without beam clipping. Also the input and output optics may change. Changing the input beam parameters, by contrast, is relatively easy and can accommodate moderate (for example, two-fold) changes in the pumped diameter.

To accommodate more extensive changes the overall size of the cell can be changed. A larger cell with proportionally longer focal length mirrors will generally work better for larger pump diameters. The exact choice of amplifier mirrors and input beam parameters needed to suit a particular pump beam diameter must be optimized based on the desired gain, power, pump source, and gain medium. For example, if the amplifier cell embodiment of FIG. 2 is scaled up in size geometrically so that the focal lengths of the mirrors are increased, but the input light beam diameter $\omega_1$ is scaled up in size as the square root of the geometric scale factor, the beam diameter $\omega_2$ within the amplifier also scales as the square root of the geometric scale factor and can accommodate a larger pump beam radius, which can provide higher output power.

The amplifier cell shown in FIG. 2 could amplify cw, modulated, Q-switched, or ultrashort pulses, and the large beam diameter in the Brewster angle plate 40 is advantageous in preventing nonlinear effects when amplifying high peak power pulses. The cell is useful for amplifying single transverse mode beams. The cell can be pumped by an oversized mode and can then support a wider field of view for the input beam, although the output mode quality and the amplifier cell efficiency may degrade.

Figure 5:
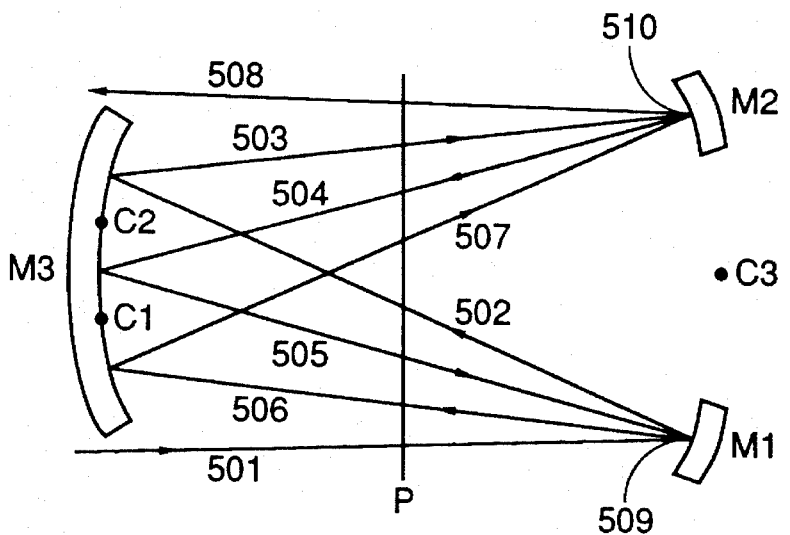
FIG. 5 illustrates a multi-pass cell in the prior art known as a "White cell."

FIG. 5 illustrates a multi-pass optical device known as a "White Cell", introduced by J. U. White in Jour. Opt. Soc. America, vol. 32 (1942) pp. 285–288, incorporated herein by reference. The White Cell includes three spherical mirrors, M1, M2, and M3 with respective centers of curvature C1, C2, and C3 as shown. Two mirrors, M1 and M2, face a third mirror M3. A light beam 501 enters the White Cell and is reflected along a path 502, 503, 504, 505, 506, 507, 508 that repeatedly passes through the Cell and then exits therefrom. Each refection from the first mirror M1 occurs at the same spot 509 on that mirror, and each refection from the second mirror M2 also occurs at the same spot 510 on that mirror. The three mirrors M1, M2 and M3 have equal radii of curvature R and equal focal lengths $f_0$, within practical manufacturing tolerances. The centers of curvatures of the two mirrors M1 and M2 are located in the surface of the opposing mirror M3, and the center of curvature of the mirror M3 is located in a spherical surface extending between the mirrors M1 and M2, as shown. The foci of the three mirrors M1, M2 and M3 lie in a common midplane P between the opposing mirrors. The injected light beam 501 needs to be tailored to initially have a waist at the plane P and will then continue to have a waist at the plane P after each mirror reflection. The beam waist size progression follows the same analysis as in the amplifier cell of FIG. 2. The number of passes that the beam makes before leaving the White Cell is determined by the separation of the centers of curvature C1 and C2, and this separation is adjustable. However, with some spacings of the centers of curvature, the beam entering the White Cell emerges retroreflected along the path of the input light beam after passing through the White Cell (not shown in FIG. 5).

Figure 6:
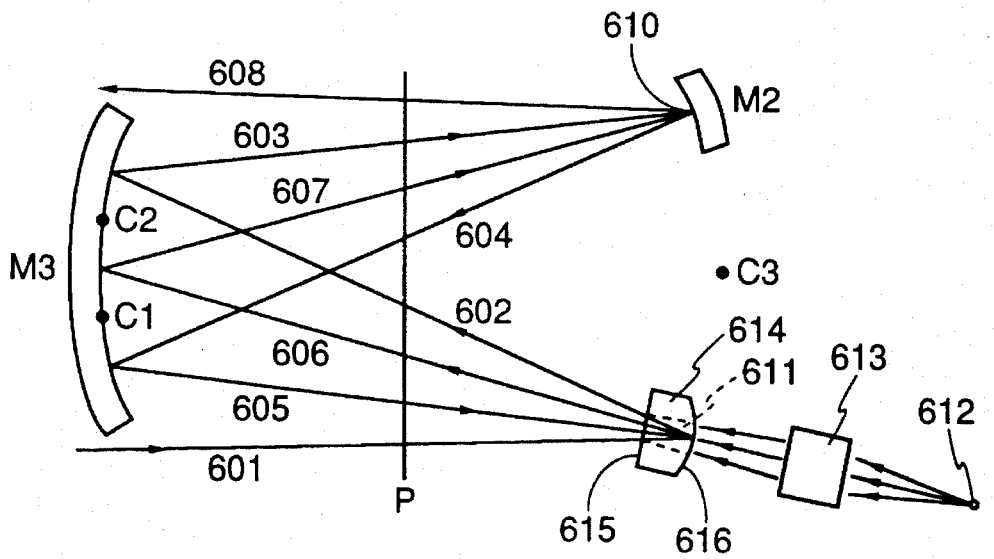
FIG. 6 illustrates another embodiment, using modifications of the White cell.

FIG. 6 illustrates an embodiment of the invention, using a White Cell as an optical or laser amplifier cell. This is a more complex three-mirror alternative to the preferred embodiment of FIG. 2. The White Cell amplifier has a gain medium located contiguous to a mirror, and this amplifier is more sensitive if thermally induced misalignment or wedging occurs at or in the gain medium. The light beam follows a multi-pass path through the White Cell along the consecutive path segments 601, 602, 603, 604, 605, 606 and 607 and exits from the White Cell along a path segment 608. However, a laser gain medium/mirror combination 614, shown in greater detail in FIG. 6A, replaces the mirror M1 of FIG. 5, and an active volume 611 where the beams pass through the gain medium 614 is pumped by a light source 612 that is imaged by suitable optics 613. The pump light source may be any appropriate pump, for example, one or more laser diodes. The tailored beam from one or more laser diodes may be sent using lenses, mirrors, prisms, fibers or other standard optical components to the active volume 611.

First and second surfaces 615 and 616 of the gain medium 614 are coated to pass light with the pump wavelength $\lambda_P$ and to reflect light having the wavelength $\lambda_L$. Mirrors M2 and M3 are coated to be highly reflective for the light beam being amplified. The gain medium 614 is shown with an outwardly facing convex surface; however there are many options to make the light beam at the gain medium 614 experience focusing equivalent to the mirror M1 of FIG. 5. For example, instead of flat surfaces 615 and 616, these surfaces could be convex or concave. Alternatively, the surfaces 615 and 616 can be flat and a lens 617 can be placed in proximity to the surfaces 615 and 616. Alternatively, the surface 616 can be antireflection coated, and a concave mirror can be used in proximity to surface 616. The waste heat portion of the pump power deposited in the gain medium 614 can cause development of a thermal lens within the gain medium. One or more of the mechanisms discussed above for controlling focusing power on the gain medium 614 can be used to compensate for thermal lensing.

For the multi-pass laser amplifier cell embodiments shown in FIGS. 2, 4 and 6, a beam is amplified by multiply passing through a gain medium. Beam waists are located in the plane P approximately midway between mirrors defining the cell. The radii of these beam waists can be understood using the analysis of H. Kogelnik and T. Li, "Laser beams and resonators", Proc. I.E.E.E., vol. 54 (1966) pp. 1312–1329. The concept of matching the gain and beam profiles is discussed by K. Kubodera & J. Noda, ibid., and by D. L. Sipes, ibid. The method for calculating the cavity mode involves Gaussian beam calculations, and is described by Kogelnik and Li and is in many standard optics and laser texts, including A. E. Siegman, *Lasers*, ibid. The embodiments shown in FIGS. 2 and 4 are multi-pass amplifier designs that are confocal. The foci of opposing mirrors may (but need not) have identical focal lengths that lie in a common plane (P) located approximately midway between the mirrors. The mirrors preferably have radii of curvatures, R and focal lengths $f_0 = R/2$. The multi-pass amplifier design regarded as a resonator has a Rayleigh range, $z_R$, equal to $f_0$. The beam waist sizes, $\omega_1$ (for light travelling on a path parallel to an axis between the reflective surfaces) and $\omega_2$ (for light travelling on a diagonal path), for consecutive cycles through the amplifier cell can differ. This difference can be tolerated because the beam only passes through the gain medium after one-to-one reimaging by the cell, and the gain medium acts as an aperture in the cell. The beam waist sizes on alternating passes are related to the focal length $f_0$ by a relation governing imaging of beam waists, $$f_0 \pi \omega_1 \omega_2 \lambda. \tag{4}$$

Consequently, if the input beam is tailored to have a beam waist radius of $\omega_1$ at the plane P then the beam will be refocused to a waist located at the gain medium in plane P, and the beam radius there will be $\omega_2$. On alternate passes through the plane P, the waist radius will alternate between $\omega_1$ and $\omega_2$ as long as the amplification in the gain medium is linear across the beam profile and does not effectively aperture or expand by preferentially apodizing or amplifying the wings of the beam profile. Ideally, the beam radius in the gain medium is self-replicating in the amplifier, which means that the gain profile and the beam profile should overlap, as needed with all end-pumped lasers. Because the light beam passes through the gain medium at slightly differing angles on each pass, the beam overlap cannot be perfect on all passes but will manifest acceptable overlap on the average.

Similarly, the amplifier gain generally changes with time. For example, as pulses pass through the gain medium over a time scale of nanoseconds the pulses are amplified as the energy is extracted. Also the overlap can not be perfect on all passes, but again it can match on the average for many passes of the beam. If the input beam radius $\omega_1$ is too large or small then the radius $\omega 2$ in the gain medium will be too small or large.

In the cell of Georges et al shown in FIG. 1 the focal lengths of the two opposing cell mirrors differ, and this changes the analysis and behavior of the cell. In FIGS. 2, 3 and 4, the optical thicknesses of the gain medium 13 and of the Brewster angle plate 40 used in these embodiments are not the same as an equivalent thickness of air, and this will also slightly perturb the mode size analysis and the optimal spacing of the amplifier mirrors. However, the thickness of the gain medium and of the Brewster angle plate are small compared with the dimensions of the optical paths in the amplifier cell, and in practice the amplifier is empirically aligned, with the spacing of the mirrors 18 and 25 in FIG. 2 being adjusted to account for these small effects.

We claim:

1. A multiple-pass light amplifier comprising:

a confocal resonator including first and second curvilinearly shaped mirrors facing each other along a resonator axis and having a common optical focal point positioned between the mirrors, the two mirrors being arranged so that a light beam that passes through the common focal point is subsequently received by either of the mirrors and is reflected toward the other mirror in a direction that is approximately parallel to the resonator axis;

an optical gain medium, having a diameter that is small compared the distance between the two mirrors and being positioned at the common focal point of the two mirrors;

optical translation means, positioned between the two mirrors so that the translation means does not lie on the resonator axis, for receiving and translating a light beam travelling parallel to the resonator axis by a small, controllable amount in a direction approximately perpendicular to the resonator axis so that, when the light beam issues from the translation means, the light beam travels substantially parallel to the resonator axis;

light beam insertion means for introducing a light beam produced by the light source into the region between the first and second mirrors; and light beam removal means for removing a light beam from the region between the first and second mirrors, whereby a light beam introduced into the region between the first and second mirrors has approximately the same diameter each time the beam passes through the gain medium.

2. The apparatus of claim 1, wherein each of said first and second mirrors is a paraboloidal light-reflecting surface with a parabola focal point approximately coinciding with said common focal point.

3. The apparatus of claim 1, wherein at least one of said first mirror and said second mirror is approximately a spherical light-reflecting surface with a spherical focal point approximately coinciding with said common focal point.

4. The apparatus of claim 1, wherein said first mirror is combined with a lens system: having at least one lens and being positioned between said first mirror and said common focal point so that a light beam leaving said first mirror that passes through the lens system and that passes through the common focal point is subsequently received by said second mirror and is reflected toward said first mirror in a direction that is approximately parallel to the resonator axis.

5. The apparatus of claim 1, wherein said first and second mirrors are approximately identical and are positioned at approximately equal distances from said common focal point.

6. The apparatus of claim 1, wherein said first and second mirrors are positioned at unequal distances from said common focal point.

7. The apparatus of claim 1, further comprising at least one light beam aperture positioned between said first and second mirrors to suppress parasitic oscillations of a light beam amplified by passage through said optical gain medium.

8. The apparatus of claim 1, wherein said optical gain medium includes a solid-state laser material drawn from the group consisting of Nd:YLF, Nd:YAG, Nd:YVO$_4$, Nd:YOS, Nd:glass, Cr:LiSAF, Cr:LiCAF, Er:glass, Tm:YLF, Tm:YAG, Tm:YVO$_4$, Ho:Tm:YLF, Ho:Tm:YAG, Ho:Tm:YVO$_4$, Yb:YLF, Yb:YAG, Yb:YVO$_4$, Ti:sapphire, ruby and alexandrite.

9. The apparatus of claim 1, wherein said optical gain medium is segmented into two or more amplifier components.

10. The apparatus of claim 1, further comprising an optical gain medium temperature change means, connected to said optical gain medium, for changing the temperature of said gain medium.

11. The apparatus of claim 1, further comprising optical gain medium pump means for pumping said optical gain medium longitudinally.

12. The apparatus of claim 1, further comprising optical gain medium pump means for pumping said optical gain medium transversely.

13. The apparatus of claim 1, further comprising defocusing means, positioned adjacent to said optical gain medium, for controllably reducing the focusing of a light beam incident on said gain medium, to compensate for thermal lensing in said gain medium.

14. The apparatus of claim 1, wherein said optical translation means is a body, of substantially transparent material and having two approximately parallel light-receiving surfaces, that is positioned so that a light beam propagating parallel to said resonator axis and incident on a light-receiving surface of the body, passes through this body is translated a controllable distance away from said resonator axis.

15. The apparatus of claim 1, wherein said optical translation means is a body, of substantially transparent material and having two approximately parallel fight-receiving surfaces, that is positioned so that a light beam, propagating parallel to said resonator axis and incident on a light-receiving surface of the body, passes through this body is translated a controllable distance toward said resonator axis.

16. The apparatus of claim 1, wherein said optical gain medium includes a liquid.

17. The apparatus of claim 1, wherein said optical gain medium includes a gas.

18. The apparatus of claim 1, wherein said beam insertion means includes an aperture in said first mirror or in said second mirror positioned on or adjacent to said resonator axis.

19. The apparatus of claim 1, wherein said beam insertion means includes a third mirror, positioned between said first mirror and said second mirror, to receive a light beam from a light source and to reflect this light beam toward said first mirror, toward said second mirror or toward said gain medium.

20. The apparatus of claim 1, wherein said beam removal means includes an aperture in said first mirror or in said second mirror positioned on or adjacent to said resonator axis.

21. The apparatus of claim 1, wherein said beam removal means includes a small third mirror, positioned between said first mirror and said second mirror, to receive and reflect a light beam after this light beam has passed through said gain medium at least once.

22. The apparatus of claim 1, further comprising a retro-reflector positioned to receive a light beam from said beam removal means and to reverse the direction of propagation of this light beam.

23. Apparatus for producing amplified spontaneous emission of light emitted by an optical gain medium by passage of this emitted light through a light amplifier at least once, the apparatus comprising:

a confocal resonator including first and second curvilinearly shaped mirrors facing each other along a resonator axis and having a common optical focal point positioned between the mirrors, the two mirrors being arranged so that a light beam that passes through the common focal point is subsequently received by either of the mirrors and is reflected toward the other mirror in a direction that is approximately parallel to the resonator axis;

an optical gain medium, having a diameter that is small compared the distance between the two mirrors and being positioned at the common focal point of the two mirrors;

optical translation means, positioned between the two mirrors so that the translation means does not lie on the resonator axis, for receiving and translating a light beam travelling parallel to the resonator axis by a small, controllable amount in a direction substantially perpendicular to the resonator axis so that, when the light beam issues from the translation means, the light beam travels substantially parallel to the resonator axis; and light beam removal means for removing a light beam from a region between the first mirror and the second mirror.

24. A multiple-pass light amplifier comprising:

a White Cell multiple-pass optical cavity, including first, second and third curvilinearly shaped mirrors, with the first and second mirrors facing the third mirror and all three mirrors having optical focal points lying on a common focal plane positioned between the mirrors, the three mirrors being arranged so that a light beam, which is reflected from the first mirror, is subsequently received by the third mirror and is reflected toward the second mirror and so that a light beam, which is reflected from the second mirror, is subsequently received by the third mirror and is reflected toward the first mirror;

an optical gain medium, having a diameter that is small compared the distance between the third mirror and either of the first mirror or the second mirror and being positioned contiguous to the first mirror or the second mirror;

light beam insertion means for introducing a light beam produced by a light source into a region between the first, second and third mirrors; and light beam removal means for removing a light beam from the region between the first, second and third mirrors.

25. Apparatus for producing amplified spontaneous emission of light by an optical gain medium, by passage of a light beam through a light amplifier at least once, the apparatus comprising:

a White Cell multiple-pass optical cavity, including first, second and third curvilinearly shaped mirrors, with the first and second mirrors facing the third mirror and all three mirrors having optical focal points lying on a common focal plane positioned between the mirrors, the three mirrors being arranged so that a light beam, which is reflected from the first mirror, is subsequently received by the third mirror and is reflected toward the second mirror and so that a light beam, which is reflected from the second mirror, is subsequently received by the third mirror and is reflected toward the first mirror;

an optical gain medium, having a diameter that is small compared the distance between the third mirror and either of the first mirror or the second mirror and being positioned contiguous to the first mirror or the second mirror;

light beam insertion means for introducing a light beam produced by a light source into a region between the first, second and third mirrors; and light beam removal means for removing a light beam from a region between the first, second and third mirrors.

* * * * *